June 10, 1952     E. C. ROMINE ET AL     2,600,329
AUTOMATIC TARE CATCHER

Filed Dec. 20, 1948     4 Sheets-Sheet 1

Inventors
EARNEST C. ROMINE
BRUNO MONTEGNA

June 10, 1952  E. C. ROMINE ET AL  2,600,329
AUTOMATIC TARE CATCHER
Filed Dec. 20, 1948  4 Sheets-Sheet 3

Inventors
EARNEST C. ROMINE
BRUNO MONTEGNA
by The Firm of Charles M. Willy Attys.

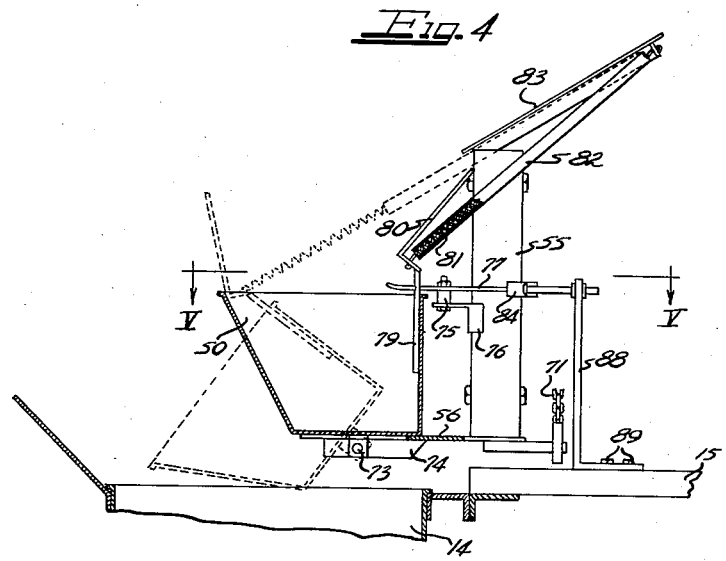
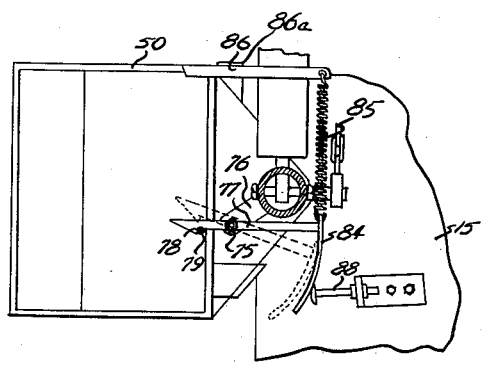
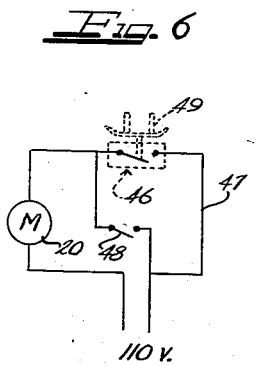
Inventors
EARNEST C. ROMINE
BRUNO MONTEGNA Patented June 10, 1952

2,600,329

UNITED STATES PATENT OFFICE 2,600,329

AUTOMATIC TARE CATCHER

Earnest C. Romine, Hardin, Mont., and Bruno Montegna, Sheridan, Wyo.

Application December 20, 1948, Serial No. 66,334

15 Claims. (Cl. 73—423)

The present invention relates to an automatic tare catcher and more particularly to a tare catcher in which a receptacle is automatically moved into position to take a sample from a moving stream of material, removed from the stream, and conveyed to a discharge point at which the receptacle is automatically dumped.

Various types of automatic tare catchers have been proposed in the art for particular uses. However, such tare catchers are typically complicated and intricate in design and operation and are unsuitable for adaption to general uses. The present invention now provides a simple and efficient tare catcher which may be employed to automatically sample material from a moving stream, whether the material be liquid or particulated.

The automatic tare catcher herein described and claimed has proved to be extremely desirable for the sampling of solid granular material, such as sugar beets, potatoes and the like. For example, in the processing of sugar beets, beets brought in from the field are conventionally run through a beet loader and a sample of the beets as received at the processing plant must be taken to determine the tare, i. e., the mud, dirt and other extraneous matter admixed with the beets, in order that the actual value of the beets may be determined. Prior to the present invention, such testing was actually carried out by manually holding a suitable receptacle, such as a bucket or basket, in the flow of beets carried by the loader, and the receptacle was then manually carried to a testing station for subsequent determination of the tare. The sampling done in this manner was not sufficiently accurate, due to the necessity of manual handling the material, the impossibility of obtaining a truly representative sample and the non-conformity of the bucket or basket to the conveyor upon which the beets were carried through the loader. Further, the expensive hand labor and time required for obtaining samples amounted to a considerable expense in the operation of a large plant. The present invention eliminates the disadvantages inherent in the procedure formerly employed and provides automatic means for obtaining a truly representative sample at a cost considerably below that previously incurred.

In general the automatic tare catcher of the present invention comprises a receptacle of suitable size and shape to conform to that portion of the loader from which the sample is taken, the receptacle being carried by pivoting means for moving the receptacle into and out of the stream of material passing through the loader. Suitable power means, such as an electric motor or an internal combustion engine, are provided for effecting movement of the receptacle through a reduction gear system, the power means being automatically interrupted upon the taking of a sample to halt further movement of the receptacle. Means are also provided for automatically dumping the sample when the receptacle is moved into position over a hopper or other suitable conveying means for carrying the sample to the testing station. Coil spring means are provided for returning the receptacle to operative position so that a further sample may be taken. Thus, movement of the apparatus from sampling position to dumping position is carried out by cooperating pivoting means suitably geared to a source of power and further means are provided for effecting vertical movement of the receptacle in timed sequence with the pivoting movement thereof, so that the receptacle is automatically moved through the above-described cycles with the actual position of the apparatus being correlated to the structure with which it is employed.

It is, therefore, an important object of the present invention to provide an automatic tare catcher for sampling material moved by suitable conveying means, the tare catcher being pivotally mounted for automatic relative movement through consecutive sampling and dumping cycles.

Another object of the present invention is to provide an improved automatic tare catcher of simple and efficient design which is driven through a suitable timed sequence of movements into a sampling position for receiving material and into a dumping position for dumping the material with means being provided for interrupting movement of the sampler upon completion of these movements.

A further important object of the present invention is to provide an improved type of automatic tare catcher comprising a receptacle adapted for pivoting movement by driving means connected to a suitable source of power, the receptacle being moved into a stream of material upon energization of the power source and being automatically moved to a dumping position upon further operation of the power source, with the receptacle being automatically dumped while in dumping position.

A still further important object of the present invention is to provide an improved type of automatic tare catcher for use in determining the tare of granulated material, comprising generally a bucket secured to a suitable source of power and adapted for movement into a stream of granulated material and from the material stream to a hopper for conveying a sample of the material thereto, the bucket being mounted for both horizontal and vertical movement to follow a predetermined, timed path correlated with the structure of the conveying machine with which the tare catcher is employed.

Other and further important objects of this invention will be apparent from the disclosure in the specification and the accompanying drawings.

On the drawings:

Figure 4 is a view of the catcher receptacle taken along the plane IV—IV of Figure 1;

Figure 5 is a view taken along the plane V—V of Figure 4; and

Figure 6 is a wiring diagram showing means for automatically interrupting operation of the device and manually resuming operation.

As shown on the drawings:

Figure 1:
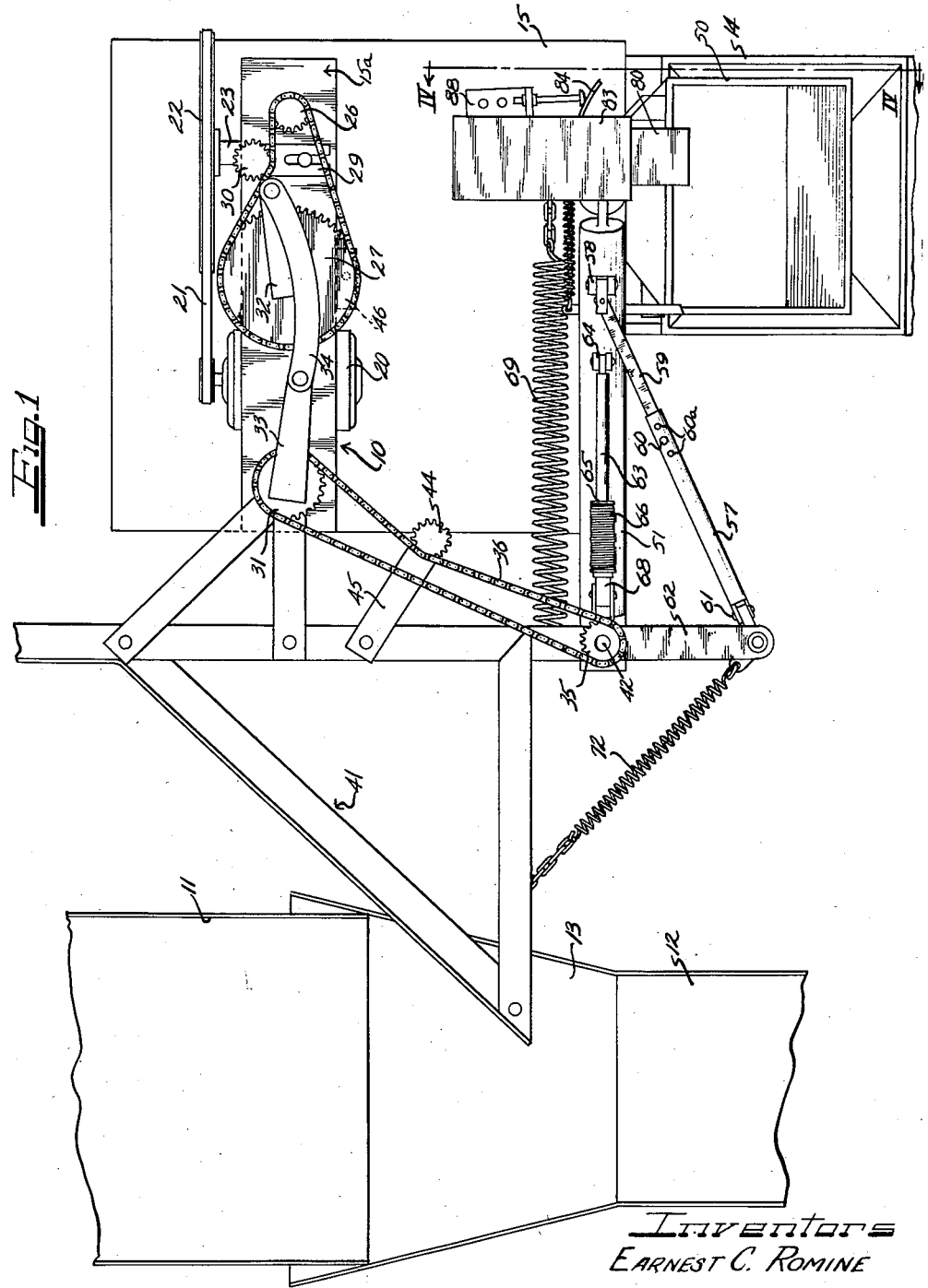
Figure 1 is a plan view of an automatic tare catcher of the present invention shown in the initial position prior to the taking of a sample from a stream of material.
Figure 2:
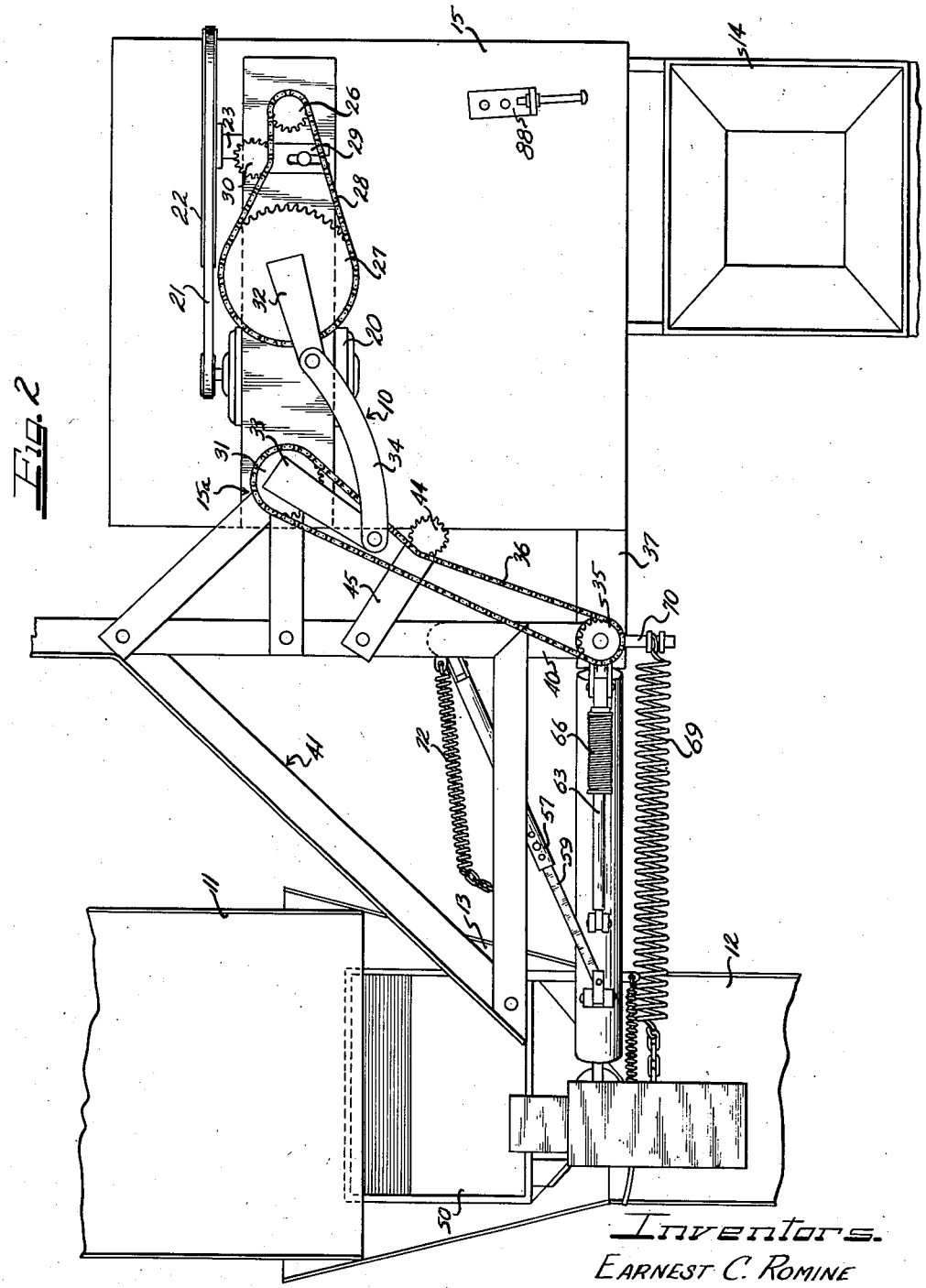
Figure 2 is a view similar to Figure 1 showing the tare catcher in its sampling position.
Figure 3:
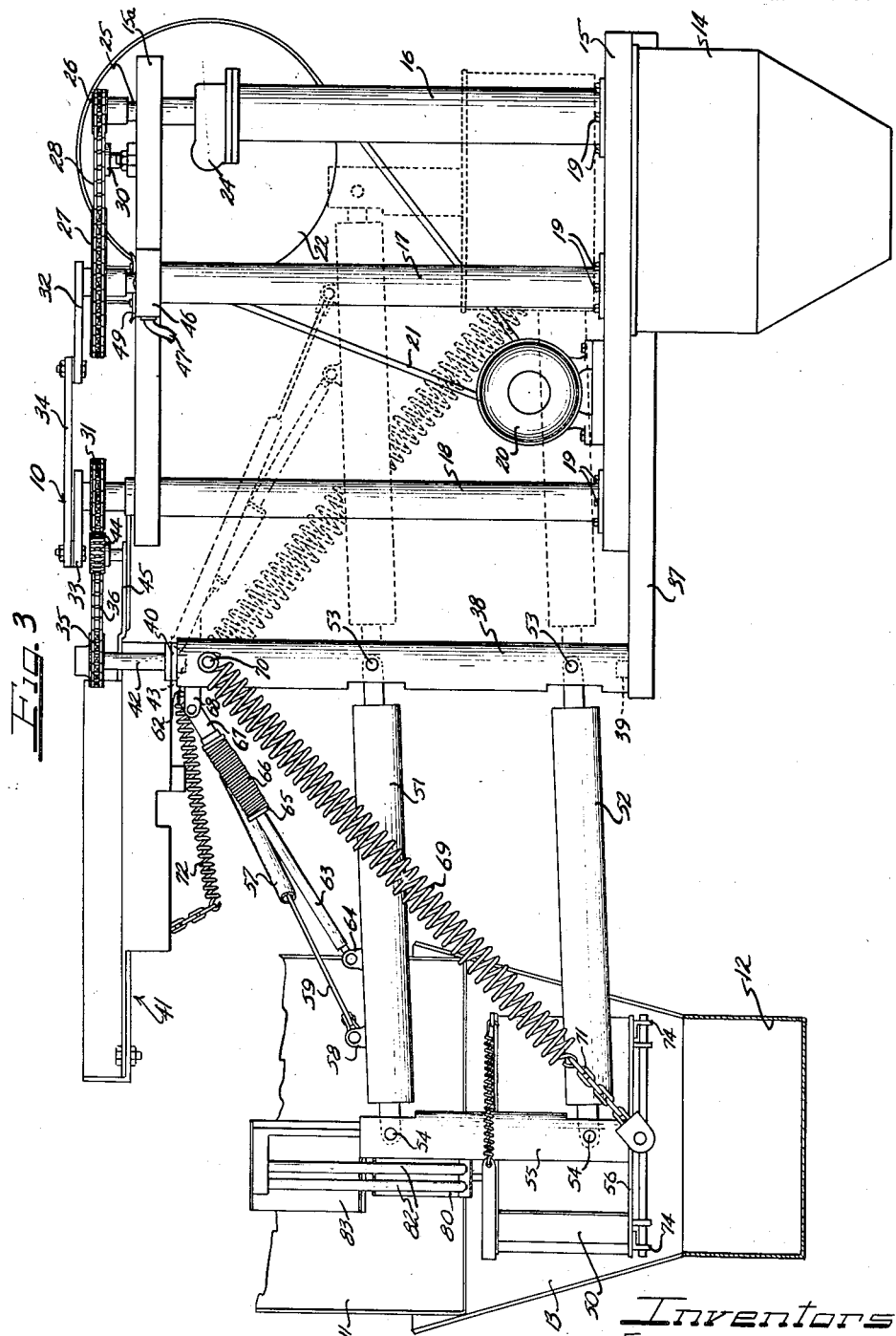
Figure 3 is a side elevational view of the sampler of Figure 1 showing, in solid outline, the sampling position of the tare catcher and, in dotted outline, the initial position of the tare catcher.

As shown in Figures 1, 2 and 3 of the drawings, the reference numeral 10 refers generally to an automatic tare catcher of the present invention as adapted for conveying granular material from a chute 11 to a hopper 14. Chute 11 delivers material to a second chute 12 spaced below chute 11 and connected thereto by a trough 13. Hopper 14 communicates with a suitable receptacle or other material retaining means (not shown). Tare catcher 10 is mounted on a base or supporting platform 15 disposed adjacent hopper 14.

The automatic tare catcher 10 of the present invention comprises generally a plurality of parallel, aligned, upstanding posts 16, 17 and 18 secured to base 15 by suitable means, as by screws 19. A suitable source of power 20, such as an electric motor, is mounted on base 15 adjacent posts 16–18, motor 20 serving to drive, through V-belt 21, a pulley 22 carrier by post 16. Pulley 22 is of relatively large diameter and serves as a reduction gear for reducing the speed of rotation of motor 20. Pulley 22 is mounted on shaft 23 (Figures 1 and 2) of a gear reduction unit 24 carried by post 16 and serving to rotate stubshaft 25 (Figure 3) rotatably carried by post 16. The shaft 25 serves to rotate sprocket gear 26 mounted thereon, the gear 26 driving larger sprocket gear 27 through chain 28. A movable plate 29, carried by a larger plate 15a overlying each of the posts 16–18 and secured thereto, serves to adjustably maintain idler sprocket 30 in position holding chain 28 taut.

Gear 27 is linked to smaller sprocket 31 by means of link arm 32, secured to the central portion of gear 27, arm 33, mounted centrally of gear 31, and connecting link 34 connecting the free ends of arms 32 and 33. Arm 32 is secured to gear 27 for rotation therewith and since the combined lengths of arm 32 and arm 34 are greater than the distance between the centers of gears 27 and 31, gear 31 is pivoted through an angle of less than 360° by the connected arms 32 and 34. Arm 33 actually oscillates through an angle of approximately 180° rather than revolving through an arc of 360°.

Oscillating gear 31 serves to oscillate sprocket 35 through chain 36, sprocket 35 being carried by post 38 mounted for pivoting movement upon stubshaft 39 carried by arm 37. Post 38 is held in upright vertically extending position by means of arm 40 forming a part of supporting framework 41 which also serves to support plate 15a hereinbefore described. Shaft 42 carrying sprocket 35 is keyed to pivotal post 38, as at 43, to effect oscillating movement of post 38 as a whole. An idler sprocket 44 is carried by arm 45 mounted on the supporting framework 41, the sprocket 44 serving to maintain the chain 36 taut.

That portion of plate 15a directly underlying sprocket 27 carries a microswitch 46 (Figure 3) connected by suitable means, as by cable 47, to motor 20. A starting switch 48, as shown in the wiring diagram of Figure 6, is provided to bypass switch 46 for starting motor 20 when switch 46 is open. A switch shoe 49 is secured to sprocket 27 for rotation therewith, the shoe 49 overriding switch 46 when sprocket 27 is rotated as hereinafter described to interrupt motor 20. Upon stopping of the motor 20, the motor may be started upon depressing starter switch 48 to operate the motor and effect rotation of sprocket 27 until shoe 49 rides beyond the microswitch 46 after which the motor circuit remains closed through switch 46 until again stopped through switch shoe 49, as hereinbefore described.

The driving mechanism above described and effecting oscillation of post 38 is employed to impart motion to a receptacle or bucket 50 which actually catches and retains a sample of material flowing from chute 11 to chute 12. Bucket 50 is linked to post 38 for oscillating movement therewith through a pair of arms 51 and 52 (Figure 3), each of which is pivotally secured to post 38, as by pins 53. Arms 51 and 52 are also pivoted, as by pins 54, to an upstanding post 55 mounted on plate 56 contacting bucket 50 (Figure 4). Parallel arms 51 and 52 thus serve to impart movement to bucket 50 in accordance with oscillating movement of post 38 relative to base 15.

Movement of arm 51 with post 38 is guided by means of pipe section 57 pivoted to arm 51 through lugs 58 secured to rectangular rod 59 telescopically received by pipe section 57. Rod 59 is retained in adjustable telescopic relation within pipe section 57 by means of pin 60 which may be placed in any one of a series of aligned apertures 60a in rod 59 and pipe section 57 (Figure 1). Pipe section 57 is pivoted through linkage 61 to a bracket arm 62 freely rotatable on shaft 42 as best shown in Figures 1 and 2. A second guide arm 63 (Figures 1 and 3) is pivotally secured to arm 51 by lugs 64, arm 63 carrying a peripheral flange 65 intermediate its length to contact compression spring 66 carried by auxiliary arm 67 pivotally mounted on post 38 through bracket 68 to telescopically receive arm 63. Though arms 59 and 63 are pivotally secured to post 38 and arm 51, these arms rotate with post 38 to guide movement of arm 51 and of bucket 50 as will be hereinafter more fully described.

A tension spring 69 is mounted on pin 70 carried by post 38 and is connected to bucket post 55 through chain 71 as shown in Figures 3 and 4. A second tension spring 72 is connected to supporting framework 41 and to movable arm 62 as shown in Figures 1, 2 and 3. Spring 69 aids in supporting the weight of bucket 50 while spring 72 serves to elevate the bucket in dumping position as hereinafter described.

As best shown in Figures 4 and 5, the bucket 50 is roughly rectangular in outline and is of such size and shape as to underlie chute 11 when moved to sampling position as shown in Figure 2. Bucket 50 is mounted on a shaft 73 carried by the bracket members 74 secured to plate 56 as shown in Figures 3 and 4, the bucket being so mounted on the shaft 73 that it is overbalanced into dumping position as shown in dotted outline in Figure 4.

A simple catch mechanism is employed to retain the bucket against dumping and is best shown in Figures 4 and 5. A pivot post 75 is carried by bracket arm 76 secured, as by welding, to post 55 and a catch bar 77 is carried by pivot post 75 for pivoting movement relative thereto. The catch bar 77 extends outwardly from post 55 to overlie the rear end of bucket 50, bar 77 being notched as at 78 in that portion overlying bucket 50. Bucket 50 carries a rod 79 extending downwardly along the bucket rear wall into the interior of bucket 50 and secured thereto.

Rod 79 is secured to an upper deflector plate 80 which in turn is secured to a pair of springs 81 contained within spring guide tubes 82. An upper deflector plate 83 overlies spring guide tubes 82 and is secured to post 55 as shown in Figure 3. Catch bar 77 is provided with a rear curved contact plate 84 which in turn is secured to a tension spring 85 carried by rod 86 connected to post 86a. Contact plate 84 is positioned to abut stop 88, secured by bolts 89 to base 15, upon movement of bucket 50 to dumping position as shown in Figures 1, 4 and 5.

In operation of the preferred embodiment of the invention as illustrated in the drawings, motor 20 is energized, as through starting button 48, to initiate movement of the apparatus. Motor 20, revolving at conventional speeds, is geared to oscillating post 38 through various speed reducing gears so that the speed of oscillation is easily correlated with a rate of flow of material in chute 11 to determine the size of samples to be caught by bucket 50.

For example, in one embodiment of the invention, the gear reduction between motor 20 and gear 22 is suitably 6 to 1, and the reduction within gear box 24 is 9 to 1 and the reduction between gears 26 and 27 is 3 to 1 with the total reduction between motor 20 and gear 27 being 162 to 1.

The linkage through arms 32, 33 and 34 between gears 27 and 31 reduces the angular displacement of gear 31 to a value of approximately 180° with the gear 31 being returned to its initial position upon further rotation of gear 27. By chain 36 this oscillating movement of gear 31 is transmitted to post 38 carrying the arms 51 to 52 through an arc of the same magnitude as the oscillation of post 38. Thus, bucket 50 is moved through an arc of approximately 180°.

One extremity of this arc is shown in Figure 1, in which the bucket, in initial position, is positioned directly over hopper 14. The other extremity of the arc of bucket 50 is illustrated in Figure 2 in which the bucket is positioned beneath chute 11 directly in the flow of material therefrom. Upon reaching this second position beneath chute 11, the bucket is maintained in position therein by the arrangement of arms 32-34 until the bucket is filled with material from the chute following which the bucket is returned to the position of Figure 1. Upon return to this position, the curved contact arm 84 abuts bumper 88, pivoting bar 77 to release rod 79, thus allowing the overbalanced bucket to fall forward as shown in dotted outline in Figure 4, dumping the contents of the bucket into hopper 14.

It will be noted in Figure 4 that upon release of the bucket the springs 81 become elongated to allow the bucket to fall forward. Springs 81 are strong enough to return the empty bucket 50 to its original position, with spring 85 urging pivot arm 77 to its initial position to again engage rod 79 following dumping.

An important feature of the present invention is illustrated in Figure 3 in which the lowering of the bucket to extend under chute 11 is clearly shown. The springs 66 and 69 are counterbalanced with spring 66 being stronger than spring 69 so that when bucket 50 is pivoted to its loading position compression spring 66 forces arm 51 downwardly to lower the bucket to extend under chute 11. However, upon pivoting movement of the bucket 50 to its dumped position as shown in Figure 1, the combined strengths of springs 69 and 72 are greater than the compression strength of spring 66 so that the bucket is elevated as shown in dotted outline in Figure 3. The spring 72 is brought into play by means of arm 62 which is free to pivot about shaft 42 although the arm 62 is moved by arm 59 and pipe section 57 during movement of the bucket 50. The degree of depression of the bucket 50 may be varied by means of pin 60 allowing relative adjustment of arm 59 within pipe section 57. Thus, the angle of downward displacement of bucket 50 and the point at which spring 72 will be brought into play to elevate bucket to be varied at will by means of adjustable arm 59 to suit the apparatus of the present invention to the particular environment in which it is employed.

It should be understood that the apparatus of the present invention may be modified in other ways to suit the environment in which it is employed. For example, the angle of pivoting movement of post 38 may be varied by changing the lengths of arms 32, 33 and 34, the apparatus may be made to move continuously to automatically take samples and to act in a given time sequence by eliminating switch 46, the time of taking samples may be varied through a wide range by the use of different gear ratios, and different types of primary power sources may be employed to fit the needs of the individual case.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. An automatic tare catcher comprising a supporting base, a post pivotally secured to said base, means including pivotal links connecting said pivoted post to a suitable source of power for effecting cyclic pivoted movement thereof through an including angle of less than 360°, a bucket linked to said post and adapted for movement therewith into a stream of material and out of said stream to a position for dumping the material in said bucket, and means for automatically halting said pivotal movement upon completion of a single sample taking and dumping cycle.

2. An automatic tare catcher comprising a supporting base, a post pivotally connected to said base, means including pivotal links connecting said post to a suitable source of power for pivoting movement, supporting means carried by said post and extending therebeyond, means carried by said post and secured to said supporting means for effecting pivoted movement of said supporting means independently of said post, and a bucket carried by said supporting means for pivoting movement with said post and for additional pivoted movement relative thereto into a stream of material to fill said bucket and further pivoting movement away from said stream of material to convey material within said bucket to a dumping position.

3. An automatic tare catcher comprising a supporting base, a post pivotally secured to said base, gear means connected to said post and to a suitable source of power for imparting pivoting movement to said post, supporting arms pivotally secured to said post and extending therebeyond for movement both with said post and relative thereto in a plane normal to that of post pivoting movement, a bucket secured to said arms for movement with said arms in said normal plane, and dumping means including disengageable elements with one element secured to said post and another element secured to said bucket, whereby said bucket is moved into a stream of material upon pivoting movement of said post and out of the stream of material upon further movement of said post to convey material from said stream, with said dumping means serving to dump material from said bucket upon movement of said bucket from said stream.

4. An automatic tare catcher comprising a supporting base, a vertical post pivotally connected to said base, means connecting said post to a suitable source of power for imparting pivoting movement to said post, a pair of spaced parallel supporting arms pivotally secured to said post for movement therewith in a horizontal plane and for movement relative thereto in a vertical plane, additional supporting means joining said arms, a bucket carried by said additional supporting means for movement with said arms in both of said planes, and dumping means including a spring urged catch maintaining said bucket in upright position and means for disengaging said catch to allow inversion of said bucket to dump its contents.

5. An automatic tare catcher comprising a supporting base, a pivoted upright support carried by said base, gear means connected to said support and to a suitable source of power for causing pivoting movement of said support through an arc of less than 360°, a pair of supporting arms pivotally secured to said support and extending therebeyond for pivoting movement both with said post and relative thereto, an additional supporting arm joining the free ends of said first mentioned arms, a bucket carried by said additional supporting arm for full pivoting movement with said pair of supporting arms, and means for automatically dumping said bucket upon pivoting movement of said support, said last mentioned means including a spring urged pivot arm engaging said bucket, means for pivoting said arm to release said bucket and resilient means carried by said additional supporting arm for returning said bucket to that position in which it is engaged by said pivot arm.

6. An automatic tare catcher comprising a supporting base, an upright post pivotally secured to said supporting base, means for effecting pivoting movement of said post, a support arm pivoted to said post for movement therewith in a horizontal plane and also pivoting movement relative thereto in a vertical plane, a bucket carried by said support arm for movement therewith in each of said planes and counterbalanced means carried by said post and acting on said arm, said counterbalanced means including a biasing element for urging said arm upwardly and another biasing element for urging said arm downwardly for controlling movement of said support arm in said vertical plane relative to said post.

7. In an automatic tare catcher comprising a supporting base, an upright post pivotally secured to said supporting base, means for imparting pivoting movement to said post, a support arm carried by said post for movement therewith and also pivoting movement relative thereto, a bucket carried by said support arm for movement therewith and counterbalanced spring means resiliently interposed between said bucket and said post for controlling movement of said support arm relative to said post, said last mentioned means including a compression spring urging said bucket downwardly at one extremity of the pivoting movement of said bucket and a tension spring urging said bucket upwardly at the other extremity of its pivoting movement.

8. In an automatic tare catcher including a supporting post, a bucket, and supporting means carrying said bucket for pivoting movement about said post into a sampling position and a dumping position, means for causing relative vertical movement of said bucket during its pivoting movement comprising a compression spring secured to said post and to said support means for urging said bucket downwardly at its sampling position, a first tension spring secured to said post and to said support means for urging said bucket upwardly at its sampling position, said compression spring being stronger than said first tension spring so that said bucket is depressed in sampling position, and a second tension spring also secured to said post and to said support means and relaxed at sampling position but effective at dumping position to act in combination with said first tension spring to move said bucket upwardly against said compression spring.

9. In an automatic tare catcher having a receptacle mounted on a pivotal supporting structure for pivoting movement about an upright post into a sampling position and a dumping position, means interposed between and secured to said supporting structure and said post for effecting relative vertical movement of said receptacle during pivoting movement comprising a compression spring, a first tension spring, a second tension spring and adjustable guide means, said compression spring being stronger than either one of said tension springs when exerted individually but weaker than said springs when exerted simultaneously, said second tension spring being relaxed at sampling position so that said bucket is depressed by said compression spring, and both of said tension springs overcoming said compression spring at dumping position so that said bucket is elevated, and said adjustable guide means including telescoping rigid members also interposed between said post and said supporting structure to limit vertical movement of said structure under the influence of said springs, thereby determining the degree of elevation or suppression of said bracket during its pivoted movement.

10. In an automatic tare catcher having a supporting base, a post pivotally mounted on said base and means for pivoting said post, sample dumping means comprising a shaft carried by said post for pivoting movement therewith, a bucket mounted on said shaft in overbalanced position for pivoting movement about said shaft, a catch arm engaging said bucket to restrain the bucket against pivotal movement about said shaft, and a bumper carried by said base for contacting said catch arm upon pivoting movement of said post to a predetermined position to move said arm away from said bucket permitting pivoting movement about said shaft.

11. In an automatic tare catcher having a supporting base, a post pivotally mounted on said base and means for pivoting said post, sample dumping means comprising a shaft carried by said post for pivoting movement therewith, a bucket mounted on said shaft in overbalanced relation thereon for dumping movement thereabout, a rod secured to said bucket, a pivotally mounted catch arm for engaging said rod to prevent pivoting movement of said bucket about said shaft, and a bumper carried by said base for contacting said catch arm upon pivoting movement of said post to a predetermined position, said bumper pivoting said arm away from said rod to release said bucket for dumping movement about said shaft.

12. In an automatic tare catcher having a supporting base, a post pivotally mounted on said base and a dumping receptacle carried by said post, means for imparting pivotal movement to said post comprising a source of power and power transmitting means connecting said source and said post, said means including a first gear driven by said source, a link arm connected to said first gear, a second gear for driving said post, a second link arm connected to said second gear, and a connecting link connecting the free ends of said link arms, the combined length of said link arms and said connecting link being greater than the distance between the centers of said first and second gears whereby oscillating movement through an angle of less than 360° is imparted to said second gear and hence to said post.

13. In an automatic tare catcher having a supporting base, a post pivotally secured to said supporting base and a receptacle carried by said post, means for imparting oscillating movement to said post comprising a first gear, means linking said first gear to said power source, a second gear, means linking said second gear to said post, and means connecting said first gear to said second gear for imparting oscillating movement thereto.

14. In an automatic tare catcher having a supporting base, a post pivotally mounted on said base and a receptacle carried by said post, means for imparting oscillating movement to said post and for interrupting said movement comprising a power source, a first gear driven by said power source, a second gear driving said post, means connecting said first gear and said second gear for imparting oscillating movement to said second gear and to said post, switch means mounted adjacent said first gear for controlling energization of said power source, and means carried by said first gear for opening said switch to interrupt operation of said power source upon movement of said first gear to a predetermined position.

15. In an automatic tare catcher having a supporting base, a post pivotally mounted on said supporting base and a receptacle carried by said post for pivoting movement therewith, means for imparting oscillating movement to said post and for halting movement of said post in a predetermined position comprising a first gear linked to said power source, a second gear linked to said post, means connecting said first and second gears for imparting an oscillating movement to said second gear, a first switch adjacent said first gear for controlling energization of said power source, a switch shoe carried by said first gear for opening said first switch upon rotation of said first gear to interrupt energization of said power source, and a hand controlled second switch for energizing said power source when said first switch is open to cause rotation of said gear and the movement of said shoe from said first switch.

EARNEST C. ROMINE.
BRUNO MONTEGNA.

REFERENCES CITED

The following references are of record in the file of this patent:

UNITED STATES PATENTS

| Number | Name | Date |
| --- | --- | --- |
| 15,875 | Bourbin | Oct. 14, 1856 |
| 704,853 | Bretherton | July 15, 1902 |
| 891,997 | Kingsbury | June 30, 1908 |
| 1,309,572 | Gullickson | July 8, 1919 |
| 1,641,748 | Dresser et al. | Sept. 6, 1927 |
| 1,771,641 | Lamb | July 29, 1930 |
| 1,797,471 | Jones | Mar. 24, 1931 |
| 1,911,510 | Hutchinson | May 30, 1933 |